United States Patent
Dunne et al.

(10) Patent No.: US 9,025,732 B2
(45) Date of Patent: *May 5, 2015

(54) SOCIAL QUALITY-OF-SERVICE DATABASE

(75) Inventors: Jonathan Dunne, Waterford (IE); James Patrick Galvin, Jr., Georgetown, KY (US); Shailendra Maheshwari, Trimurti Nagar Nagpur (IN); Patrick Joseph O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/442,220

(22) Filed: Apr. 9, 2012

(65) Prior Publication Data

US 2013/0266125 A1 Oct. 10, 2013

(51) Int. Cl.
H04M 3/22 (2006.01)

(52) U.S. Cl.
CPC ...... *H04M 3/2227* (2013.01); *H04M 2203/558* (2013.01)

(58) Field of Classification Search
USPC .................. 379/1.01, 29.09, 121.04, 265.06, 379/142.01, 1.04, 2, 9.04
See application file for complete search history.

(56) References Cited

U.S. PATENT DOCUMENTS

| | | | |
|---|---|---|---|
| 7,852,784 B2 * | 12/2010 | Leung et al. | 370/252 |
| 7,996,047 B2 | 8/2011 | Seier | |
| 2006/0172752 A1 | 8/2006 | Harris et al. | |
| 2007/0136473 A1 * | 6/2007 | Birchler et al. | 709/226 |
| 2009/0005061 A1 * | 1/2009 | Ward et al. | 455/456.1 |
| 2009/0034711 A1 | 2/2009 | Alvarado et al. | |
| 2009/0286526 A1 * | 11/2009 | Matsunaga | 455/456.1 |
| 2010/0130206 A1 | 5/2010 | Chin et al. | |
| 2010/0222081 A1 | 9/2010 | Ward et al. | |
| 2011/0207463 A1 | 8/2011 | Zoeckler et al. | |

OTHER PUBLICATIONS

Crowdsourced maps help mobile users compare network reliability by Amy Gahran Feb. 17, 2011, CNN Tech 8 pages.*
"Method and System for Initiating a Conference Call During Non-availability of a Moderator of the Conference Call," IP.com Prior Art Database, http://priorartdatabase.com/IPCOM000202108; Dec. 3, 2010, pp. 1-3.
Mahy et al., "A Call Control and Multi-Party Usage Framework for the Session Initiation Protocol (SIP) (RFC5850)," IP.com Prior Art Database, http://priorartdatabase.com/IPCOM/000196053D; May 1, 2010, pp. 1-88.
Mitchell, "How Strong is your WiFi Wireless Signal," http://compnetworking.about.com/od/wirelessfaqs/f/signal_strength.htm, Apr. 4, 2012, pp. 1-2.

(Continued)

*Primary Examiner* — Yosef K Laekemariam
(74) *Attorney, Agent, or Firm* — Holland & Knight LLP; Brian J. Colandreo, Esq.; Jeffrey T. Placker, Esq.

(57) ABSTRACT

A method, computer program product, and system for a quality-of-service history database is described. Quality-of-service information associated with a first participant in a first electronic call is determined. The quality-of-service information is stored in a quality-of-service history database. A likelihood of quality-of-service issues associated with a second electronic call is determined, wherein determining the likelihood of quality-of-service issues includes mining the quality-of-service history database.

15 Claims, 7 Drawing Sheets

(56) References Cited

OTHER PUBLICATIONS

Cisco Systems, Inc. "Cisco Unified Service Monitor 1.1," 1992-2006 Cisco Systems, Inc., pp. 1-4.

Gahran, "Crowdsourced maps help mobile users compare network reliability," http://www.cnn.com/2011/TECH/mobile/02/15/coverage.mapping/index.html, Apr. 4, 2012. pp. 1-8.

"RF Signal Tracker," http://sites.google.com/site/android-developmentproject/home/rf-signal-tracker, Intitial Release Oct. 2009, Apr. 4, 2012, pp. 1-24/.

Al-Sanabani et al., "Mobility Prediction Based Resource Reservation for Handoff in Multimedia Wireless Cellular Networks," The International Arab Journal of Information Technology, vol. 5, No. 2, Apr. 2008, pp. 162-169.

Lee et al., "IP Mobility Performance Enhancement Using Link-Layer Prediction," Second International Conference, FGIT 2010, Jeju Island, Korea Dec. 13-15, 2010 Proceedings, pp. 171-179.

\* cited by examiner

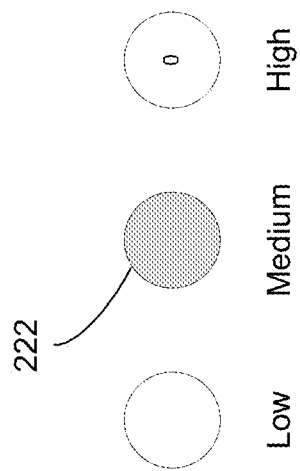
FIG. 5-c
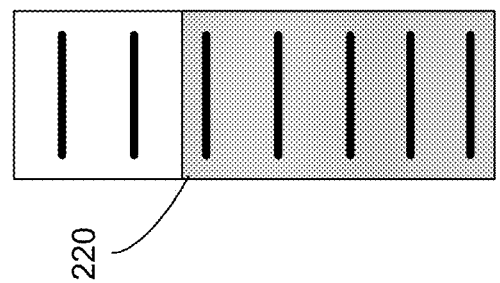
FIG. 5-b
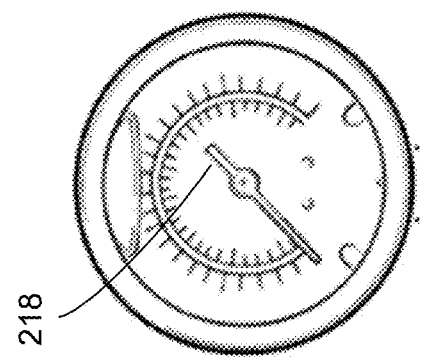
FIG. 5-a

SOCIAL QUALITY-OF-SERVICE DATABASE

TECHNICAL FIELD

This disclosure relates to electronic communication.

BACKGROUND

Participants in electronic calls of different types may sometimes experience quality-of-service issues resulting in a poor call experience. Quality-of-service issues may take various forms depending on the cause of causes of the issues, various characteristics of the affected call, or other factors. Certain aspects of quality-of-service issues affecting different calls (or call types) or different participants associated with a single call may derive from similar or related causes.

BRIEF SUMMARY OF THE DISCLOSURE

According to a first aspect of the disclosure, a computer-implemented method includes determining quality-of-service information associated with a first participant in a first electronic call. The method further includes storing the quality-of-service information in a quality-of-service history database. The method also includes determining a likelihood of quality-of-service issues associated with a second electronic call, wherein determining the likelihood of quality-of-service issues includes mining the quality-of-service history database.

One or more of the following features may be included. The method may include providing to one or more of a user and a moderator a visual indicator of the likelihood of quality-of-service issues. The visual indicator may include one or more of geographical and infrastructure-related information associated with the likelihood of quality-of-service issues. The likelihood of quality-of-service issues may be associated with a second participant associated with the second electronic call. The quality-of-service information may include one or more of a quality-of-service score associated with an electronic call, participant location data, connection information, participant device information, and a quality-of-service score associated with a geographical area. Determining the likelihood of quality-of-service issues may be based upon, at least in part, one or more of a location associated with a second participant, a trajectory associated with a second participant, and a geographical or infrastructure-related feature. Determining the likelihood of quality-of-service issues may be based upon, at least in part, one or more of a predicted call duration and calendar information. Determining the likelihood of quality-of-service issues may be based upon, at least in part, one or more of connection information and participant device information.

According to another aspect of the disclosure, a computer program product resides on a computer readable storage medium and has a plurality of instructions stored on it. When executed by a processor, the instructions cause the processor to perform operations including determining quality-of-service information associated with a first participant in a first electronic call. Instructions may be included for storing the quality-of-service information in a quality-of-service history database. Instructions may also be included for determining a likelihood of quality-of-service issues associated with a second electronic call, wherein determining the likelihood of quality-of-service issues includes mining the quality-of-service history database.

One or more of the following features may be included. The plurality of instructions, when executed by the processor, may further cause the processor to perform operations including providing to one or more of a user and a moderator a visual indicator of the likelihood of quality-of-service issues. The visual indicator may include one or more of geographical and infrastructure-related information associated with the likelihood of quality-of-service issues. The likelihood of quality-of-service issues may be associated with a second participant associated with the second electronic call. The quality-of-service information may include one or more of a quality-of-service score associated with an electronic call, participant location data, connection information, participant device information, and a quality-of-service score associated with a geographical area. Determining the likelihood of quality-of-service issues may be based upon, at least in part, one or more of a location associated with a second participant, a trajectory associated with the second participant, and a geographical or infrastructure-related feature. Determining the likelihood of quality-of-service issues may be based upon, at least in part, one or more of a predicted call duration and calendar information. Determining the likelihood of quality-of-service issues may be based upon, at least in part, one or more of connection information and participant device information.

According to another aspect of the disclosure, a computing system includes at least one processor and at least one memory architecture coupled with the at least one processor. The computing system also includes a first software module executable by the at least one processor and the at least one memory architecture, wherein the first software module is configured to determine quality-of-service information associated with a first participant in a first electronic call. The computing system also includes a second software module executable by the at least one processor and the at least one memory architecture, wherein the second software module is configured to store the quality-of-service information in a quality-of-service history database. The computing system further includes a third software module executable by the at least one processor and the at least one memory architecture, wherein the third software module is configured to determine, a likelihood of quality-of-service issues associated with a second electronic call, wherein determining the likelihood of quality-of-service issues includes mining the quality-of-service history database.

One or more of the following features may be included. A fourth software module may be configured to provide to one or more of a user and a moderator a visual indicator of the likelihood of quality-of-service issues. The visual indicator may include one ore more of geographical and infrastructure-related information associated with the likelihood of quality-of-service issues. The likelihood of quality-of-service issues may be associated with a second participant associated with the second electronic call. The quality-of-service information may include one or more of a quality-of-service score associated with an electronic call, participant location data, connection information, participant device information, and a quality-of-service score associated with a geographical area. Determining the likelihood of quality-of-service issues may be based upon, at least in part, one or more of a location associated with a second participant, a trajectory associated with the second participant, and a geographical or infrastructure-related feature. Determining the likelihood of quality-of-service issues may be based upon, at least in part, one or more of a predicted call duration and calendar information. Determining the likelihood of quality-of-service issues may be based upon, at least in part, one or more of connection information and participant device information.

According to another aspect of the disclosure, a computer-implemented method includes determining, by one or more computing devices, first quality-of-service information associated with a first participant in a first electronic call. The method further includes storing, by the one or more computing devices, the first quality-of-service information in a quality-of-service history database. The method also includes determining, by the one or more computing devices, second quality-of-service information associated with a second participant in a second electronic call. The method also includes storing, by the one or more computing devices, the second quality-of-service information in the quality-of-service history database.

According to another aspect of the disclosure, a computer-implemented method includes providing, by one or more computing devices, a quality-of-service history database and determining, by the one or more computing devices, quality-of-service information associated with a participant in an electronic call. The method further includes mining, by the one or more computing devices, the quality-of-service history database for historical quality-of-service information associated with the determined quality-of-service information and determining, by the one or more computing devices, a likelihood of quality-of-service issues associated with the electronic call, based upon, at least in part, the historical quality-of-service information.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

FIGS. 5-a through 5-c are diagrammatic views of aspects of implementations of the social quality-of-service database process;

Like reference symbols in the various drawings indicate like elements.

DETAILED DESCRIPTION OF THE PREFERRED EMBODIMENTS

Figure 1:
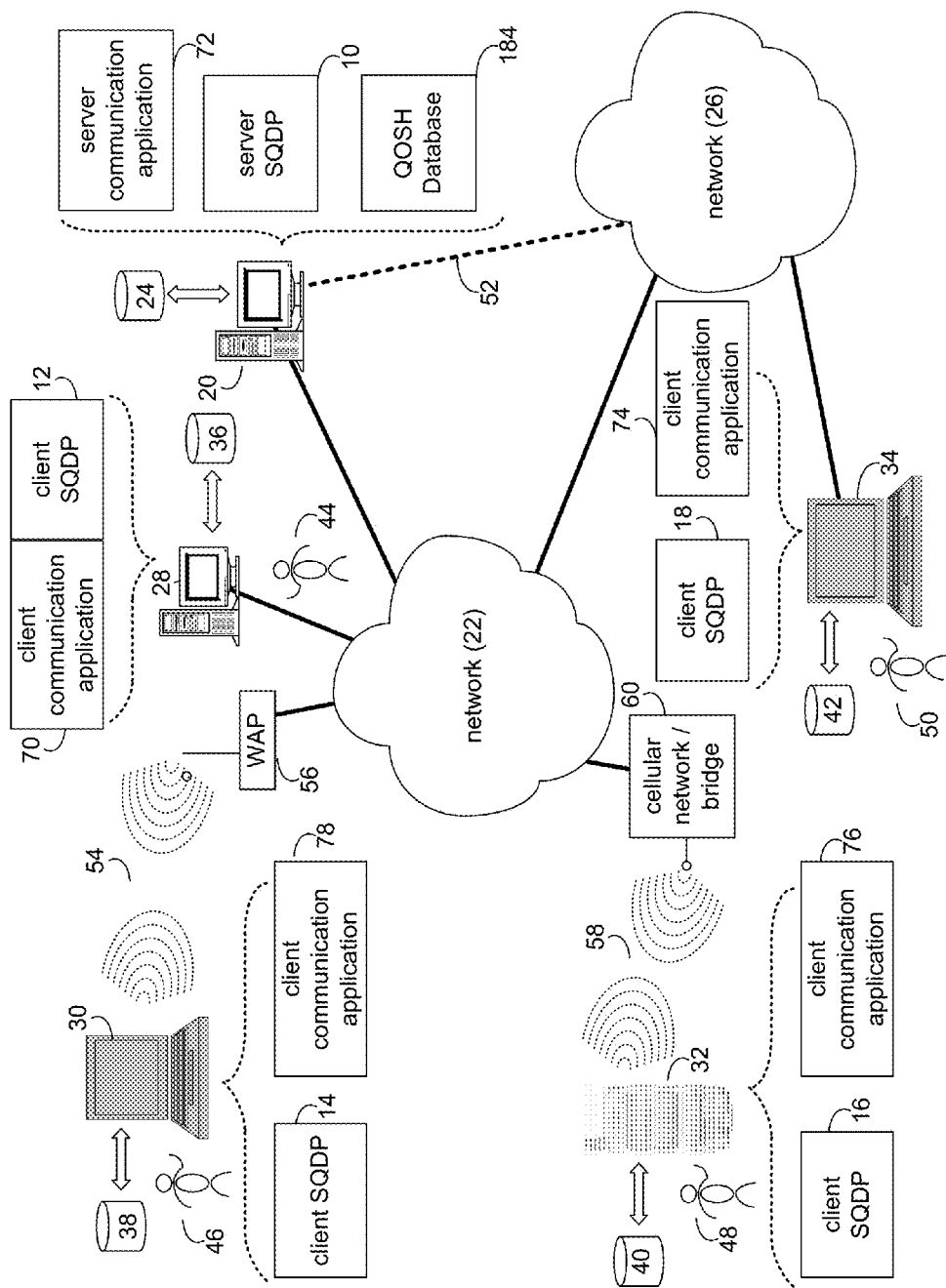
FIG. 1 is a diagrammatic view of a social quality-of-service database process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
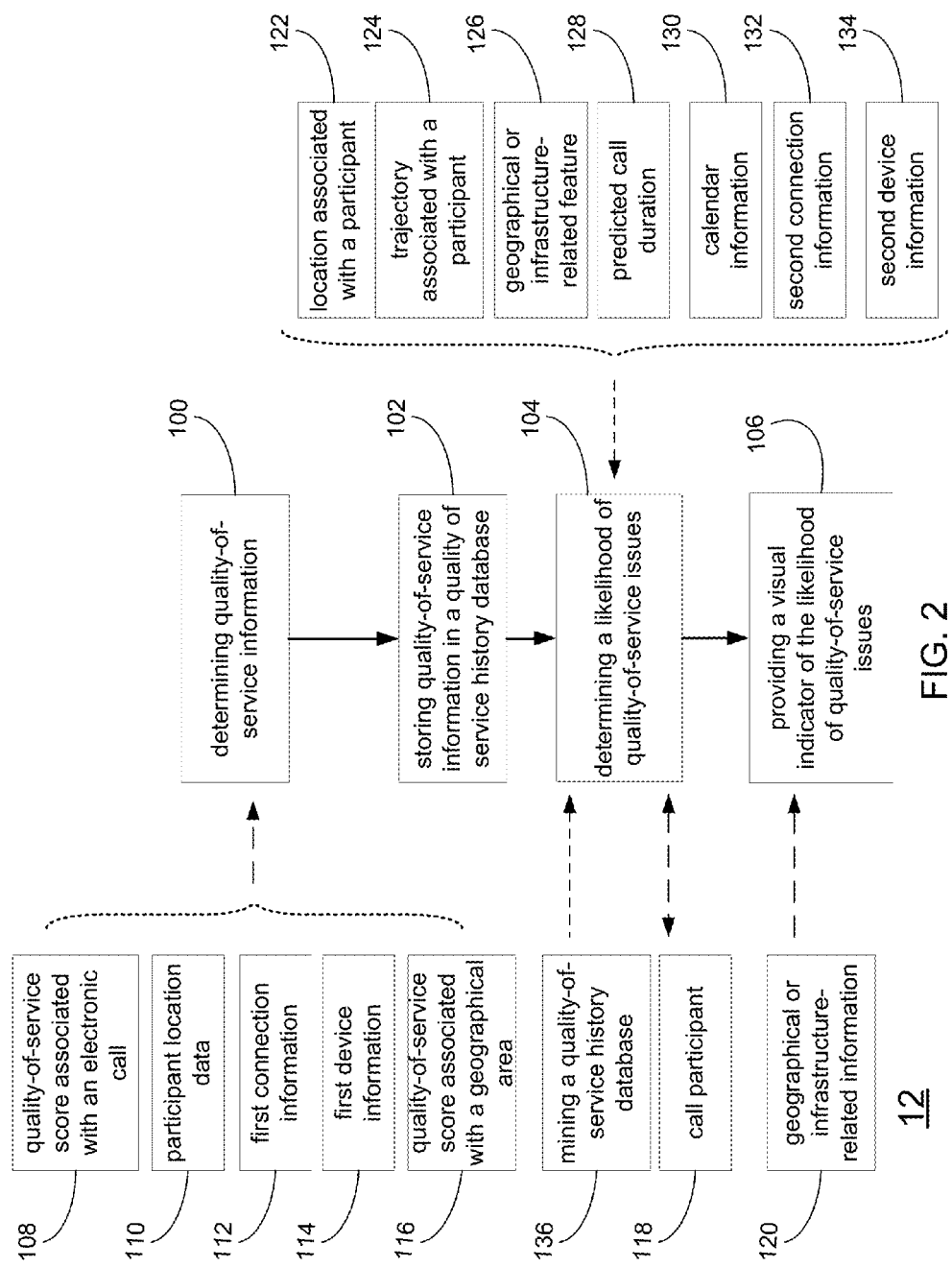
FIG. 2 is a flowchart of a process executed by the social quality-of-service database process of FIG. 1.
Figure 3:
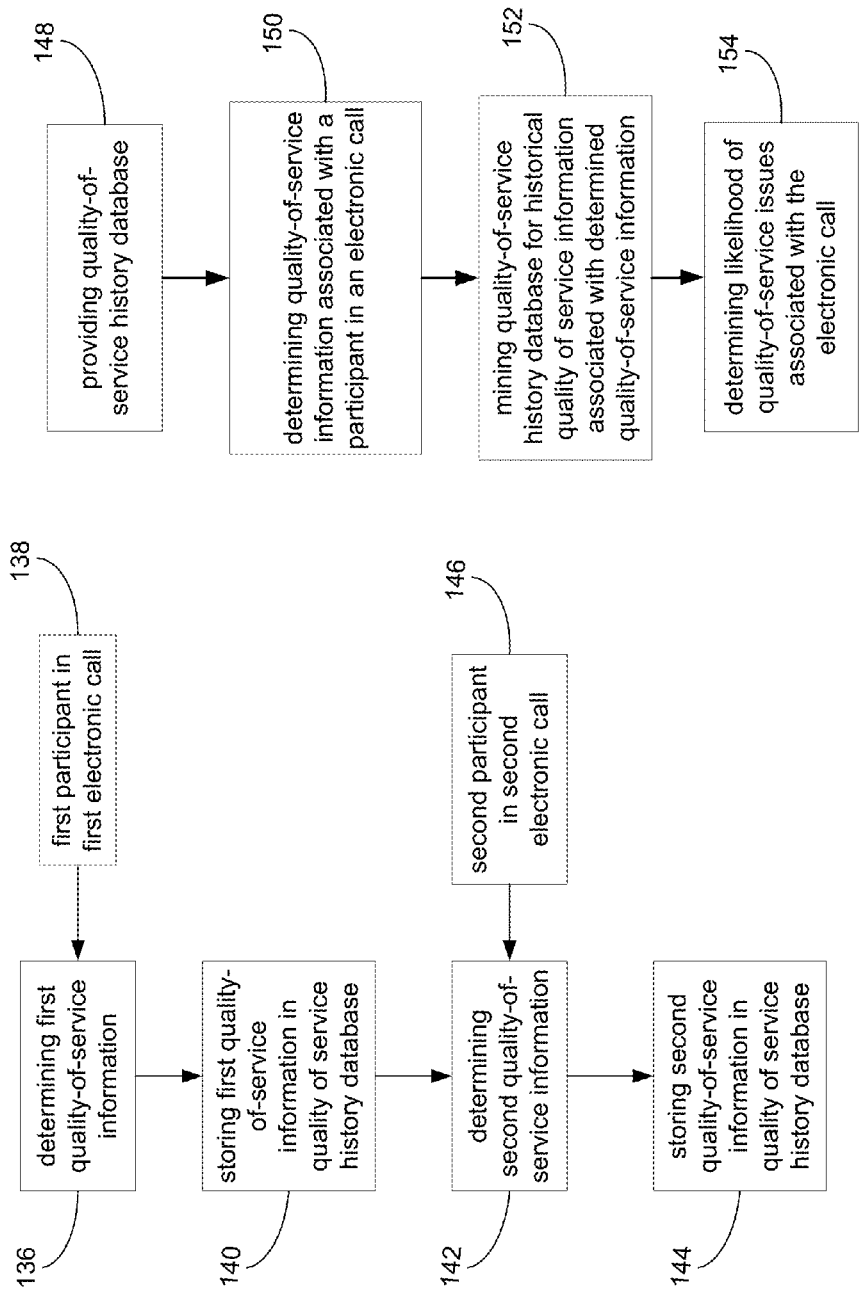
FIG. 3 is a flowchart of a process executed by the social quality-of-service database process of FIG. 1.

Referring to FIGS. 1, 2 and 3, there is shown a social quality-of-service database process (SQDP), for example client SQDP 12. It will be understood that although the discussion herein may sometimes refer to a particular process as a descriptive example, e.g., client SQDP 12, the description may also encompass alternative implementations of the process, e.g., through server SQDP 10 or a combination of one or more client and server processes.

As will be discussed further below, client SQDP 12 may determine 100 quality-of-service information, which may be associated with a participant in an electronic call (or "call"). Quality-of-service information may be determined 100 by client SQDP 12. (In certain embodiments, a first quality-of-service information associated with a first participant in a first electronic call 138 may be determined 136 and a second quality-of-service information associated with a second participant in a second electronic call 146 may also be determined 142.) The quality-of-service information may include a variety of factors, including, for example, a quality-of-service score associated with an electronic call 108, participant location data 110, first connection information 112, device information 114, or a quality-of-service score associated with a geographical area 116. The quality-of-service information may be stored 102 in a quality-of-service history database. (In certain embodiments, storing 102 the quality-of-service information may include storing 140 quality-of-service information associated with a participant in a first electronic call 138 and storing 144 quality-of-service information associated with a participant in a second electronic call 146.)

Client SQDP 12 may further include determining 104 a likelihood of quality-of-service issues. Determining 104 the likelihood of quality-of-service issues may be associated with a participant 118 in an electronic call and may be based upon a location associated with a participant 122, a trajectory associated with a participant 124, an infrastructure-related feature 126, a predicted call duration 128, calendar information 130, second connection information 132 and device information 134. Client SQDP 12 may further include providing 106 a visual indicator of the likelihood of quality-of-service issues, which may include geographical or infrastructure-related information.

Determining 104 a likelihood of quality-of-service issues may be based upon mining 136 a quality-of-service history database. In certain embodiments, an SQDP provides 148 a quality-of-service history database. Further, an SQDP may determine 150 quality-of-service information associated with a participant in an electronic call. An SQDP may also mine 152 the provided quality-of-service history database for historical quality-of-service information (e.g., quality-of-service information associated with historical electronic calls) associated with the determined quality-of-service information. An SQDP may determine 154 the likelihood of quality-of-service issues associated with an electronic call, based upon mining 152 the quality-of-service history database.

A SQDP may be a server-side process (e.g., server SQDP 10), a client-side process (e.g., client SQDP 12, client SQDP 14, client SQDP 16, or client SQDP 18), or a hybrid server/client process (e.g., the combination of server SQDP 10 and one or more of client SQDPs 12, 14, 16, 18), in which some, or all, of the functionality of the SQDP is performed by the server and some, or all, of the functionality of the SQDP is performed by one or more clients.

Server SQDP 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server® Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server SQDP 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server™, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; and Apache is a registered trademarks of Apache Software Foundation in the United States, other countries, or both.) Network 22 may be connected to one or more secondary networks (e.g., network 26), examples of which may include but are not limited to: a local area network; a wide area network; or an intranet, for example.

Client processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CEO, Red Hat® Linux®, or a custom operating system.

The instruction sets and subroutines of client SQDPs 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

One or more of client SQDPs 12, 14, 16, 18 and server SQDP 10 may interface with each other (e.g., via network 22 and/or network 26). A communication application may operate on a client device (e.g., client communication application 78, operating on client electronic device 30; client communication application 70, operating on client electronic device 28; client communication application 74, operating on client electronic device 34; or client communication application 76, operating on client electronic device 32). Client communication applications may include, for example, Lotus Sametime® Unified Telephony or applications facilitating Voice over Internet Protocol (VoIP) calls. (Lotus and Sametime are trademarks of International Business Machines Corporation in the United States, other countries or both.) A client SQDP (e.g., client SQDP 14) or a server SQDP (e.g., server SQDP 10) may be in communication with a client communication application (e.g., client communication application 78) or may be part of the client communication application.

A communication application may additionally or alternatively operate on a server device (e.g., server communication application 72, operating on server computer 20). Server communication applications may include, for example, Lotus Sametime® Unified Telephony or applications facilitating Voice over Internet Protocol (VoIP) calls. (Lotus and Sametime are trademarks of International Business Machines Corporation in the United States, other countries or both.) A server SQDP (e.g., server SQDP 10) or a client SQDP (e.g., client SQDP 14) may be in communication with a server communication application (e.g., server communication application 72) or may be a part of the server communication application.

Users 44, 46, 48, 50 may, for example, access server SQDP 10 directly through the device on which the client process (e.g., client SQDPs 12, 14, 16, 18) is executed, namely client electronic devices 28, 30, 32, 34. Users 44, 46, 48, 50 may access server SQDP 10 directly through network 22 and/or through secondary network 26. Further, server computer 20 (i.e., the computer that executes server SQDP 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client SQDP 12 will be described for illustrative purposes. It should be noted that client SQDP 12 may be incorporated into server SQDP 10 and may be executed within one or more applications that allow for communication with client SQDP 12. However, this is not intended to be a limitation of this disclosure, as other configurations are possible (e.g., stand-alone client processes and/or stand-alone server processes.) For example, some implementations may include one or more of client SQDPs 14, 16, 18 or server SQDP 10 in place of or in addition to client SQDP 12.

It may be useful to both groups (e.g., business teams) and individuals, acting in professional and/or personal capacities, to communicate with other groups and individuals through electronic calls. Electronic calls may take a variety of forms and may include audio or video communication and may be facilitated by a variety of communication applications. For example, individuals may participate in calls using cell phones or fixed-line telephones. Individuals may also sometimes participate in calls using computers or computing devices, which may sometimes permit communication through video as well as audio means. Electronic calls may be implemented via communication applications, for example, client communication application 70 or server communication application 72. Electronic calls may be implemented using traditional telephony principles or through the use of cellular towers or may be implemented using Internet Protocol (IP) methods, as in, for example, Voice over IP (VoIP) calls. VoIP refers to the general method of facilitating audio communication through the delivery of audio and audio-visual information over IP networks. VoIP may also be referred to as IP telephony, Internet telephony, Voice over Broadband (VoBB), broadband telephony, and broadband phone. VoIP may be implemented using a variety of communication and computing devices, including cell phones and fixed-line telephones.

In one implementation of an electronic call, groups and individuals may participate in electronic calls facilitated by unified telephony (UT) systems. UT sessions may allow two or more participants to communicate using a variety of devices, for example cell phones, fixed line phones and computers or computing devices. Conventional UT servers may typically be deployed as part of a UT system and multiple servers may be implemented using both vertical and horizontal scaling. A UT server typically may provide audio and video capabilities to users that are configured on the server, permitting voice and video conferences across a plurality of users. As an example, a communication application such as Lotus Sametime® Unified Telephony may execute on server computer 20 as server communication application 72. (It will be understood that Lotus Sametime® Unified Telephony and other communication applications may operate additionally or alternatively as client communication applications, e.g., client communication application 70.) Lotus Sametime® Unified Telephony provides unified communications middleware which integrates telephony across multivendor Public Branch Exchange (PBS) systems and provides a unified end user experience, including integrated softphones, phone and IM presence awareness, and call management and control across multiple communications systems. UT technology may employ industry standard protocols such as Session Initiation Protocol (SIP) and other protocols defined by the Internet Engineering Task Force (IETF).

An SQDP (e.g., client SQDP 12) may be useful for moderators of electronic calls as well as participants. (It is understood that a moderator may also be a participant associated with electronic call and that one or more moderators may be associated with one or more electronic calls or participants.) For example, an SQDP may provide a moderator an indicator associated with the likelihood of success of an electronic call. In certain embodiments, for example, the indicator may alert the moderator (or a participant) that an electronic call is likely to fail. Based upon this alert, the moderator may then take appropriate action to avoid the call failure or mitigate its effect, e.g., alerting other moderators or participants, facilitating one or more remedial measures, or prescribing configuration or scheduling parameters for later calls. It will be appreciated that this may increase the perceived quality of electronic calls among participants.

An SQDP may be useful for moderators (and participants) of multi-party calls. For example, a call moderator may sometimes be a manager or group leader who is planning to receive important business information from various team members. If, for example, the moderator or one or more of the participants is alerted that a team member is likely to experience quality-of-service issues at a particular time during the call, the moderator may implement measures to ensure full delivery of that team member's information before the identified time. Alternatively, a moderator may be able to schedule an alternate call time or connection with the affected team member or to implement other remedial measures.

An SQDP may provide a moderator with other useful information. For example, data mining may indicate trends and permit inferences associated with, for example, locations, time periods, or participants. For example, SQDP may determine information indicating that a particular user on a multi-party call is most likely to experience (or cause) quality-of-service issues. Such information may be calendar-based, indicating, for example, that caller Beth tends to experience quality-of-service issues on Tuesday mornings. Such information may also be based upon location, indicating, for example, that caller Daphne tends to experience quality-of-service issues when passing through a particular map quadrant or nearby a particular reference feature (e.g., a tower or other building, a mountain, a tunnel, etc.). Other information may be useful to the described functionality and a variety of trends and inferences may appear.

Figure 4:
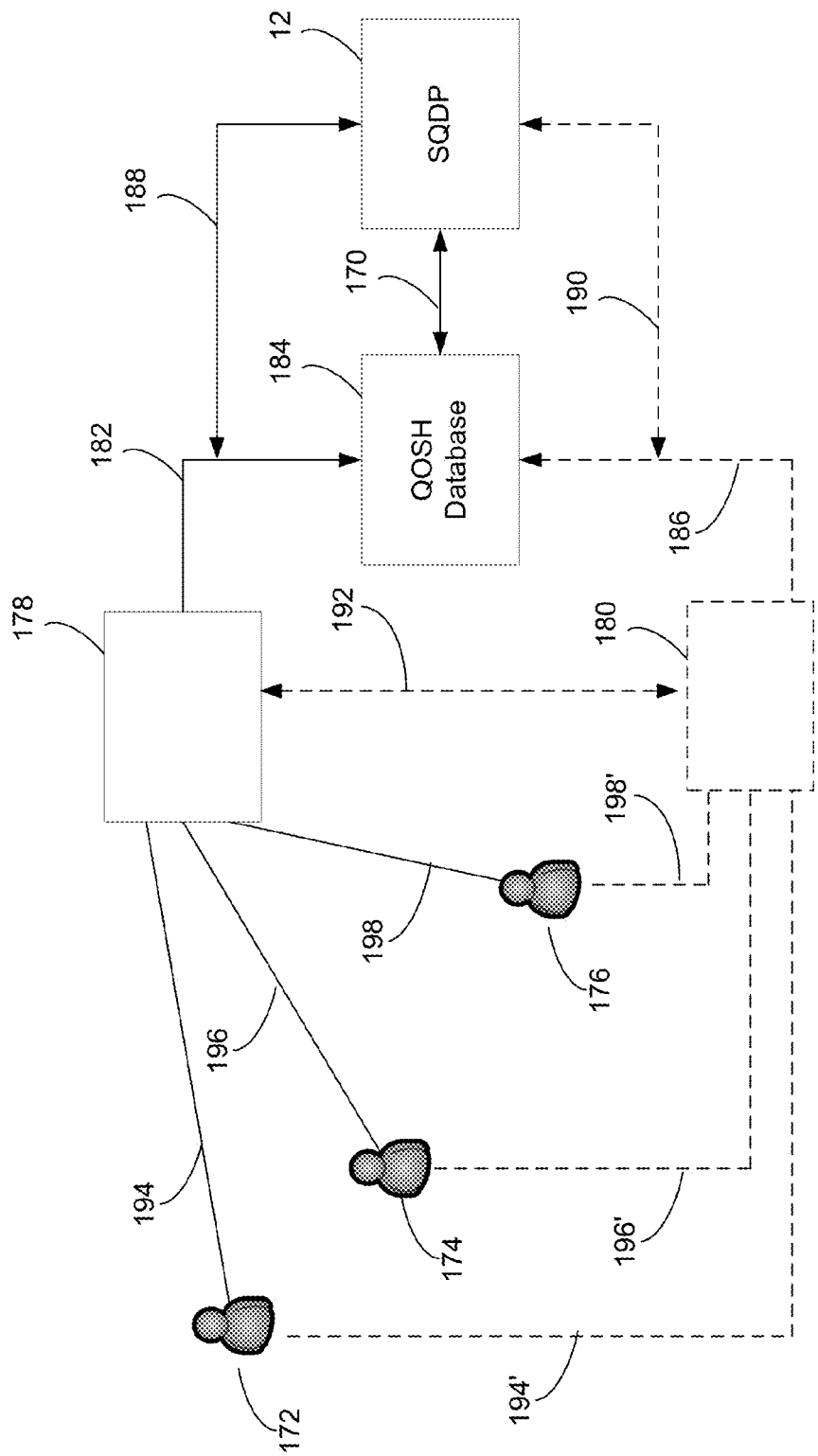
FIG. 4 is a diagrammatic view of an aspect of an implementation of the social quality-of-service database process.

Referring now also to FIG. 4, client SQDP 12 may include determining 100 quality-of-service information associated with a first participant in a first electronic call. This may be accomplished through a variety of means and may include transmission of data over communication channels and routing of data through one or more servers or other network hardware. For example, electronic call 82 includes participants 172, 174 and 176. (It will be understood that participants 172, 174, and 176 may correspond, for example, with users 44, 46 and 48 in FIG. 1.) These participants may be using a variety of device types, including cell phones, fixed-line phones, computers and VoIP capable devices, and multiple devices may be associated with a particular participant. Communication among the participants may be facilitated with a variety of network configurations. For example, participants may communicate via unified telephony server 178, using communication channels 194, 196 and 198, or may communicate via device 180 (which may be a different server, e.g., sever computer 20, a cell tower or bridge, e.g., cellular network/bridge 60, a wireless network router, e.g., WAP 56, etc.), using alternate communication channels 194', 196' and 198'. (It will be understood that various network and connection configurations not described herein may be possible and that various network hardware may connect to other network hardware as well as to participants and moderators, as indicted, for example, by connection 192.)

In call 82, client SQDP 12 may determine 100 quality-of-service information associated with user 176, by directing to user 176 a request for various characteristics associated with user 176, using, for example, communication channel 198. Quality-of-service information associated with user 174 similarly may be determined 100 by directing a request to user 174 for various characteristics associated with user 174, using, for example, communication channel 196'. Alternatively, quality-of-service information associated with a given user may be stored remotely from the user. For example, characteristics associated with user 172 may be stored on a remote storage device (not shown) which may, for example, be in communication with server 178 or other network hardware. It will be understood that this functionality and the various other aspects of an SQDP may be carried out in real-time and near real-time.

Once determined, client SQDP 12 may, for example, store 102 quality-of-service information in a quality-of-service history (QOSH) database, e.g., QOSH database 184. (QOSH database 184 is shown in FIG. 1 as being associated with server computer 20. It will be understood that a QOSH database, such as QOSH database 184 may additionally or alternatively be associated with a different computing device.) QOSH database 184 may be in communication with network hardware such as server 178 or may receive quality-of-service information via various communication channels. The stored quality-of-service information (which may be referred to as historical quality-of-service information) may be accessed by an SQDP, for example, in order to determine a likelihood of quality-of-service issues. As noted above, an SQDP may be resident on a variety of computing systems, including client systems and hosted systems and thereby employ various communication paths in order to access information in a QOSH database or elsewhere. An SQDP may, for example, communicate with QOSH database 184 via connection 170 and may communicate directly or indirectly with various network hardware (e.g., via connections 188 or 190) and system users (e.g., with user 176 via connections 188, 182 and 198).

In one embodiment, quality-of-service information may be, or be based upon, an industry standard score. For example, quality-of-service information may be a Perceptual Evaluation of Speech Quality (PESQ) score. PESQ refers to test methodology standards for assessment of audio (e.g., speech) quality, which may be determined in an automated manner. Determining quality-of-service information may include, therefore, receiving a PESQ score or information associated with a PESQ score associated with a call or call participant. A PESQ score or other quality-of-service score 108 may be associated with a particular electronic call or calls.

Quality-of-service information is not limited to PESQ scores. It may also include, for example, other quality-of-service scores based on industry standards or other factors, which may be associated with a particular electronic call or with other parameters. For example, quality-of-service information may include a quality-of-service score 116 associated with a geographical area, for example, a quality-of-service score assigned by a wireless network provider or call participant to a bounded geographical region. Quality-of-service information may also include participant location data 110, which relates to the location of a participant in a call, and may be associated with various representations of maps and map information. Participant location data 110 may also include information associated with the movement or expected movement of a participant in a call, for example the trajectory of a vehicle on which the participant is traveling (e.g., trajectory 124), and/or data indicating an appointment in a remote location that will require the participant to travel to one or more geographical areas (e.g., calendar information 132). Location data (e.g., participant location data 110 or a location associated with a participant 122) may be determined in a variety of ways. For example, use of Global Positioning Systems (GPS), cell phone tower information, or other means may permit an SQDP or other process to determine a participant's current location and/or trajectory.

Quality-of-service information may also include connection information, such as first connection information 112 or second connection information 132. Connection information may refer to various characteristics associated with a particular communication channel. For example, connection information may relate to network characteristics such as bandwidth and total network load. Connection information may relate to network outage or capacity information, including information relating to network over-load conditions. Connection information may also refer, for example, to connection type, such as whether a network is a broadband network, a cellular network, a mixed network, a private network, etc.

Quality-of-service information may also include a variety of other information types relating to quality of service. For example, quality-of-service information may include participant device information, e.g., first device information 114 or second device information 134. Participant device information may include various characteristics associated with the device, such as brand or model information, hardware and software characteristics, etc. Quality-of-service information may also include, for example, atmospheric or other weather conditions or calendar information (e.g., information relating to expected call duration).

An SQDP may further include storing 102 quality-of-service information in a QOSH database. In this social aspect of an SQDP, quality-of-service information from multiple participants and multiple electronic calls may be aggregated into one or more databases. These databases, such as QOSH database 184, may be in communication with to participants in a call (not shown) or may be coupled to one or more facilitating devices, such as server 178.

An SQDP may mine 136 a QOSH database. Based upon mining 136 of a QOSH database, an SQDP may determine 104 the likelihood of quality-of-service issues associated with a call. As used herein, quality-of-service issues may include any variety of phenomenon that results in degradation or perceived degradation of call quality. For example a quality-of-service issue may include total or partial call failure, the loss of audio or video information, jitter, packet loss, latency issues, or other problems affecting the quality or perceived quality of sound or video associated with a call.

As noted above, a QOSH database may contain various types of information associated with, for example, location information (e.g., participant location data 110), network characteristics (e.g., connection information 112), participant device type (e.g., device information 114), etc. By mining 136 a QOSH database for patterns associated with these and other parameters, an SQDP may, for example, determine 104 a likelihood of quality-of-service issues equal to (or relating to) a probability of one or more participants in a particular electronic call experiencing quality-of-service issues. A likelihood of quality-of-service issues may relate to a present time, a future time, a specific time or a time period, or any combination thereof. Various analytical techniques may be applied, as part of or separate from mining 136 a QOSH database, in order to determine the likelihood of quality-of-service issues. For example, Bayesian inference, a known statistical technique, may be useful to determine and update the likelihood of quality-of-service issues. (It will be understood that a likelihood of quality-of-service issues may be updated in real-time or near real-time.)

Mining 136 a QOSH database may include various analytical techniques. Mining of data may generally refer to the process of discovering patterns from information contained within a data set and may employ techniques of artificial intelligence, machine learning, statistical analysis, business intelligence, predictive analytics, and various database system techniques. Mining of data may be automated or semi-automated and may be used to identify previously unrecognized patterns (e.g., through cluster analysis), unusual data (e.g., through anomaly detection) and various dependencies (e.g., through association rule mining). Mining of data may address entire available data sets or may include sub-sets of available data. Mining of data may also include factor analysis, regression analysis, structured data analysis, sequence mining, or other analytical techniques.

The representation or content of a likelihood of quality-of-service issues may vary. As one example, a likelihood of quality-of-service issue may include an indication that x % of a set {x} of users are likely to suffer quality-of-service issues in a particular area or that y % of a set {y} of users would be expected to suffer quality-of-service issues within a determined amount of time. Sets {x} and {y} of users may overlap in membership and may be associated with, for example, historic calls with call parameters (e.g., participant device information, connection information, geographic or trajectory information) that may be related to call parameters associated with an ongoing electronic call. Other types of probability scoring may be included in some embodiments, for example, an indication that a particular electronic call (or cal participant) is 17% likely to be affected by a quality-of-service issue in the next 73 minutes.

These and other likelihoods may also relate to geographical regions, in which case an SQDP may provide an indicator that, for example, user Herman is likely to experience quality-of-service issues in geographical region H. To facilitate this, geographical regions may be designated with a quality-of-service score, based on, for example, a quality-of-service threshold value set by a network provider or administrator. In the example above, determining the likelihood of quality-of-service issues for Herman may be based upon region H having been assigned a quality-of-service score falling below a pre-determined threshold score.

It will be further understood that a likelihood of quality-of-service issues may be associated with one or more participants (e.g., call participant 118). (Note that the participants may themselves be associated with one or more electronic calls.) It will also be understood that a likelihood of quality-of-service issues may be determined 104 for a participant that may not have contributed information to a QOSH database. An SQDP may determine, for example, a likelihood of quality-of-service issues associated with a participant (e.g., participant 138) from whom information for a QOSH database has been previously received. Alternatively, an SQDP may determine, for example, a likelihood of quality-of-service issues associated with a participant from whom no information for a QOSH database has been previously received. In either case, to facilitate determination of the likelihood of quality-of-service issues, an SQDP may determine one or more types quality-of-service information associated with the participant in order to more effectively determine a likelihood of quality-of-service information and may then store the determined quality-of-service information in a QOSH database for future use.

An SQDP may determine a likelihood of quality-of-service issues based upon, at least in part, at least one of a location 122 associated with a second participant, a trajectory 124 associated with the second participant, and a geographical or infrastructure-related feature 126. (As noted above, location information and related data may be determined using a variety of means, including GPS systems or analysis of information relating to cell phone signals or cell phone tower location.) As an example, a particular location may be associated with Charlie, a participant in an electronic call (e.g., the location where Charlie is currently calling from). This information may be used to determine, for example, that Charlie is located in an area with poor cell phone reception (as may be determined, for example, by mining a QOSH database for geographical—or other—quality-of-service information), which may indicate a greater likelihood of quality-of-service issues if Charlie is using a cell phone on the call.

Similarly, location information 122 may be used in combination with trajectory information 124 to determine a likelihood of quality-of-service issues. For example, Charlie may currently be located in a region with good cell phone reception (as may be determined, for example, by mining a QOSH database) but may be moving while participating in the call (e.g., driving, riding on a train, walking, bicycling, etc.). Based on Charlie's trajectory, it may be determined that he is likely soon to enter an area with poor cell phone reception. This may indicate, for example, a higher likelihood of quality-of-service issues, if Charlie continues his trajectory.

Various geographical or infrastructure-related features 126 may also be used by an SQDP to determine 104 a likelihood of quality-of-service issues. Infrastructure-related features may include, for example, locations of tunnels and bridges, the type and quality of available transit paths (e.g., roads, rails, etc.), or traffic or construction information. Infrastructure-related information may sometimes relate to specific infrastructure-related features, which may include topological impediments to signal strength such as concentrated buildings, tunnels, and bridges. (It will be understood that these and other quality-of-service patterns discussed herein may be determined by mining a QOSH database or through other means.) Geographical features may include features such as mountains, valleys, hills, rivers, canyons, and various other formations.

Returning to the previous example, a likelihood of quality-of-service issues may be determined based upon Charlie's location. This may be based, for example, directly on quality-of-service information associated with Charlie's location (e.g., when a quality-of-service threshold value is associated with the geographical region that includes Charlie's location). Alternatively, for example, the likelihood may be determined based upon a particular infrastructure-related or geographical feature located near Charlie's location, which may have known (or expected) effects on Charlie's quality-of-service (as may be determined, for example, by mining the QOSH database). For example, Charlie may be located near a geographical feature such as a mountain range or valley, or an infrastructure-related feature such as a cluster of buildings, a tunnel, a traffic jam, or a bridge, all of which may have detrimental effects on quality-of-service. Accordingly, these features may be useful in determining 104 a likelihood of quality-of-service issues associated with Charlie and the instant call. In analysis of this type, Charlie's trajectory may also provide useful information. For example, if Charlie is on a train approaching a tunnel or a mountain range, Charlie's location and trajectory, combined with the geographical or infrastructure-related feature information (i.e., the location and quality-of-service effects of the tunnel or mountains), may be used to determine a likelihood of quality-of-service issues.

It will be understood that an SQDP may allow determining a likelihood of when quality-of-service issues are likely to resolve as well as when they are likely to begin. For example, trajectory information 124 may be combined with an assessment of a geographical quality-of-service score, e.g., quality-of-service score 116, (or other information derived from mining a QOSH database) to determine that participant Eudora is likely to experience quality-of-service issues as she enters geographical region A (in approximately 37 seconds). Trajectory and geographical information may also be assessed, for example, to determine that the quality-of-service issues for Eudora are likely to last for only 13 seconds.

An SQDP may determine the likelihood of quality-of-service issues based upon, at least in part, at least one of a predicted call duration 128 and calendar information 130. Calendar information 130 may include, for example, scheduled meetings, or notes or entries relating to the current or future location of a participant. Predicted call duration 128 represents a forecast of how long a particular call will last, and may be based upon a variety of information relating to the length of an electronic call including the length of similar historical calls, behavioral patterns of various participants (e.g., all participants on a particular call tend to average less than 10 minutes for all historical calls), calendar entries, or other factors. For example, analytical techniques may indicate that calls among participants Lucy, Martin and Thadeus generally last at least 23 minutes but rarely last longer than 103 minutes. As such, an SQDP may determine a likelihood of quality-of-service issues based on an estimated call duration of between 23 minutes and 103 minutes.

As another example, a calendar entry associated with a call may indicate that the participants have set aside 1.5 hours for the call. An SQDP may use this information, alone or in conjunction with other quality-of-service information (including, for example, patterns identified through mining of a QOSH database), to determine 104 a likelihood of quality-of-service issues. For example, if a participant's calendar indicates that a call is expected to last for an additional 39 minutes and location and trajectory information associated with that participant (or another participant) indicate possible entry within 11 minutes into an area of diminished quality of service (e.g., a region with poor cell phone reception), an SQDP may determine an elevated likelihood of quality-of-service issues for the call and the traveling participant. As an alternative example, if analysis of previous calls indicate that a current call among Lucy, Martin and Thadeus is likely to last an additional 13 minutes and location and trajectory information (or other information) indicate that Thadeus may experience poor quality of service after 19 minutes, an SQDP may determine a reduced likelihood of quality-of-service issues because the call is predicted to end before the quality-of-service issue is predicted to arise.

As a further example, participant Regina may attend a regular Tuesday morning call with her supervisor and several other participants. Analysis of previous Tuesday calls (i.e., through mining a QOSH database) may indicate that Regina typically experiences quality-of-service issues mid-way through the Tuesday morning call, which typically resolve within a few minutes. This information may be used to determine a likelihood of quality-of-service issues associated with Regina and the regular Tuesday call. (It will be understood that the quality-of-service issues referred to here and elsewhere in the disclosure may arise from a variety of causes or causal patterns.)

An SQDP may also determine 104 the likelihood of quality-of-service issues based upon, at least in part, connection information (e.g., second connection information 132) or participant device information (e.g., device information 134). Connection information 132 may include information relating to the type or quality of connection employed by a participant to participate in an electronic call. For example, connection information may include data referring to whether a participant is using a broadband, cellular or other connection as well as, for example, the bandwidth available to the participant via the connection. Device information, e.g., device information 134, may include the type of device a participant is using to participate in a call (e.g., a cell phone, fixed-line phone, VoIP device, computer, etc.) and related parameters and characteristics such as brand or model information, hardware and software characteristics, etc. This information may be useful to determining a likelihood of quality-of-service issues. For example, an SQDP may determine that participant Xavier is using a particular model of cell phone with excellent reception capabilities, participant Yvette is using a computer with a broadband connection, and participant Vivak is using a particular model of cell phone with poor reception capabilities. This information may be used to determine, for example, that a high likelihood of quality-of-service issues should be associated with Vivak but not with Xavier or Yvette. (It will be understood that these aspects of determining a likelihood of quality-of-service issues and the various other aspects described herein may be used individually or in any variety of combinations.)

Referring now also to FIG. 5, an SQDP may provide 106 to a user or a moderator, using the one or more computing devices, a visual indicator of the likelihood of quality-of-service issues. A visual indicator may take a variety of forms and may include various types of information including, for example, geographical or infrastructure-related information 120. As one example, a visual indicator may include a representation of a dial-type indicator as in FIG. 5-a, in which needle 218 rotates to indicate a quality-of-service level or a likelihood of quality-of-service issues. For example, needle 218 being fully rotated in the counter-clockwise direction may indicate low probability of quality-of-service issues. As another example, a visual indicator may include representation of a level gauge as in FIG. 5-b, in which level 220 may be raised or lowered to indicate a quality-of-service level or a likelihood of quality-of-service issues. As yet another example, a visual indicator may include a representation of an indicator panel as in FIG. 5-c, in which a quality-of-service level or a likelihood of quality-of-service issues may be indicated by shading or coloring a particular shape or icon. In this case, for example, shading of shape 222 may indicate a medium likelihood of quality-of-service issues.

Information provided by a visual indicator may relate to a particular time-frame. For example, a default (or custom) time-frame may be specified by a participant or a moderator, such that a visual indication of a likelihood of quality-of-service issues may relate to the default (or custom) time-frame. As such, for example, the visual indicator represented in FIG. 5-c may indicate a medium likelihood of quality-of-service issues within the next 5 minutes. Similarly, a visual indicator may provide additional or alternate visual representations when a likelihood of quality-of-service issues relates to an imminent event. For example, the gauge level in FIG. 5-b may be indicated by one color when the likelihood of quality-of-service issues relates to the next 5 minutes and a different color when the likelihood of quality-of-service issues relates to a period beyond the next 5 minutes. As another example, the gauge level (or other representation) may flash quickly or otherwise alert a participant or moderator when a likelihood of quality-of-service issues relates to an event within a particular time frame (e.g., the next 1 minute).

Figure 6:
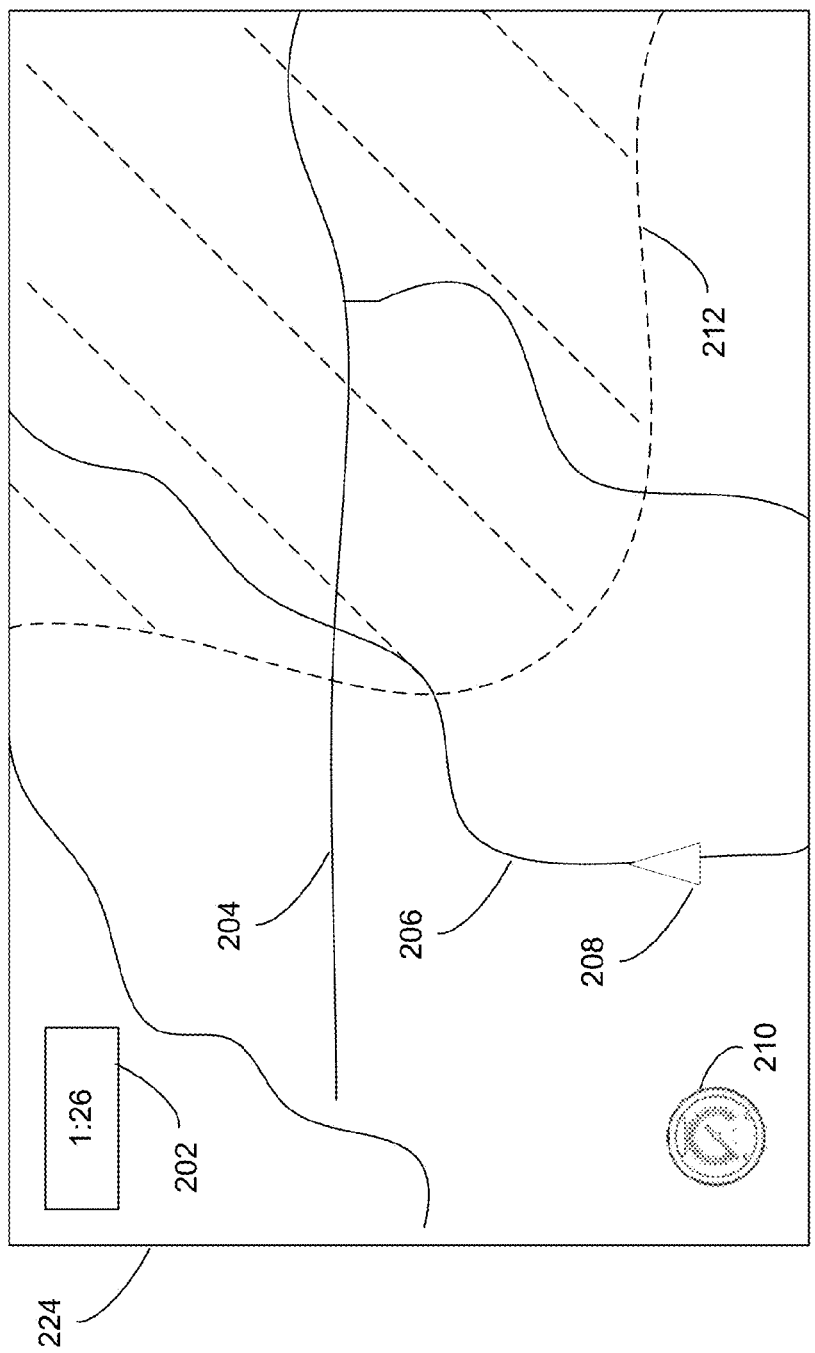
FIG. 6 is a diagrammatic view of an aspect of an implementation of the social quality-of-service database process.
Figure 7:
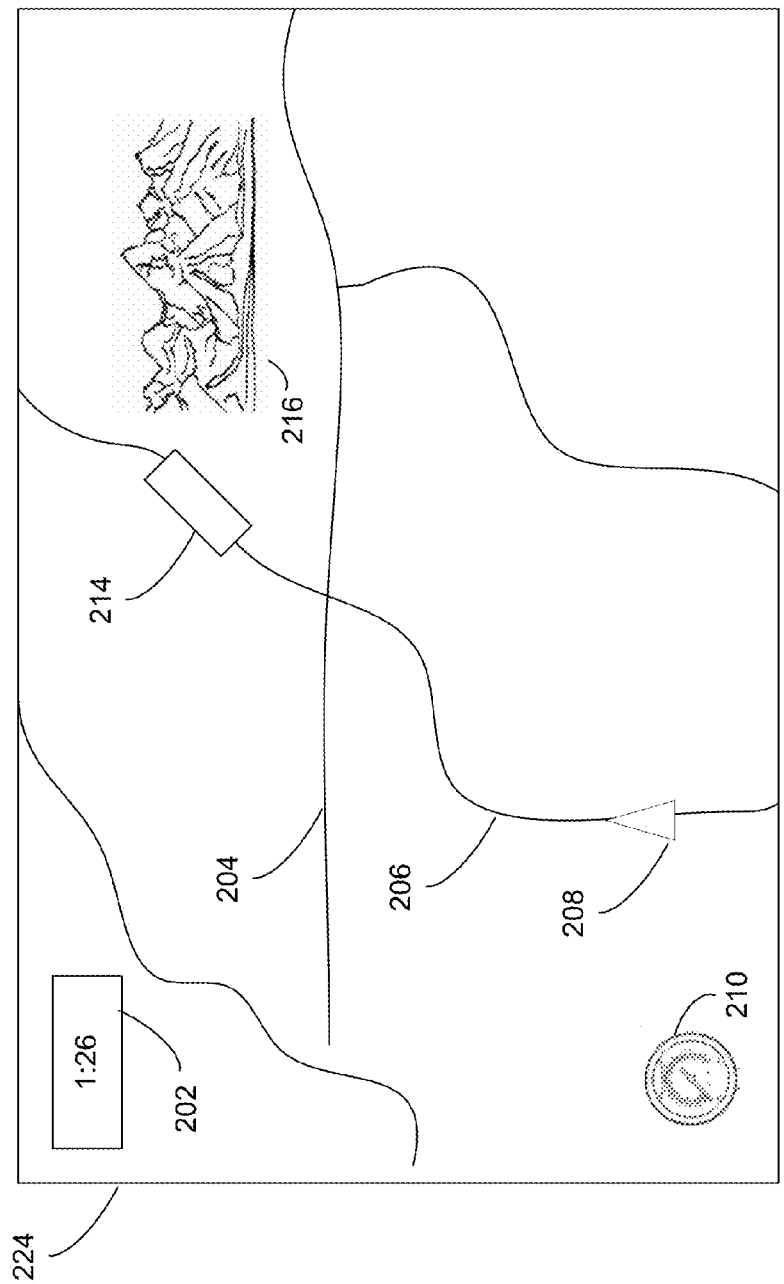
FIG. 7 is a diagrammatic view of an aspect of an implementation of the social quality-of-service database process.

Referring now also to FIGS. 6 and 7, a visual indicator may directly represent a time frame associated with a likelihood of quality-of-service issues. For example, timer 202 may indicate that user 208, with a given location and trajectory, may expect quality-of-service issues within the next 1 minute and 26 seconds. (Alternatively, timer 202 may indicate that user 208, with a given location and trajectory, may expect to be free from currently ongoing quality-of-service issues within the next 1 minute and 26 seconds.) It will be understood that various types of indicators may be combined to provide a participant or moderator with more or less information associated with a likelihood of quality-of-service issues. For example, a visual indicator may include timer 202 as well as dial-type indicator 210.

A visual indicator may include geographical or infrastructure-related information 120 associated with the likelihood of quality-of-service issues. For example, a visual indicator may include a map, e.g., map 224, representing the current location and/or trajectory of a participant in a call as well as various infrastructure-related and geographical features. Map 224 may also include, for example, various types of indicators, such as timer 202 and dial-type quality-of-service indicator 210, as well as representations of, for example, participant location 208, participant trajectory (not shown), infrastructure-related features such as roads 204 and 206 and tunnel 214, and geographical features, such as mountain range 216. Map 224 may also include information relating to a geographical quality-of-service score. For example, shaded region 212 on map 224 may indicate a region that has been assigned a low quality-of-service threshold/score, i.e., a region in which an elevated likelihood of quality-of-service issues may be expected.

A geographical visual indicator may provide useful information to a moderator or participant associated with a call. For example, based on location and trajectory information for participant 208, the path of road 206 and the location of tunnel 214 (or mountain range 216), an SQDP may determine that participant 208 may experience an elevated likelihood of quality-of-service issues within the next 1 minute and 26 seconds. Accordingly, the visual indicator may indicate a particular likelihood of quality-of-service issues (e.g., the current likelihood or a future likelihood) using dial-type indicator 210 as well as, using timer 202, the time until an expected change (e.g., elevation) of the likelihood of quality-of-service issues.

A number of embodiments and implementations have been described. Nevertheless, it will be understood that various modifications may be made. Accordingly, other embodiments and implementations are within the scope of the following claims.

What is claimed is:

1. A computer program product residing on a non-transitory computer-readable storage medium having a plurality of instructions stored thereon, which, when executed by a processor, cause the processor to perform operations comprising:
   determining quality-of-service information associated with a first participant in a first electronic call;

storing the quality-of-service information in a quality-of-service history database, wherein the quality-of-service information includes one or more geographical regions designated with a quality-of-service score, based upon, at least in part, a quality-of-service threshold value set by a user; and determining a likelihood of quality-of-service issues associated with a second electronic call including determining a likelihood of when the quality-of-service issues will begin and a likelihood of when the quality-of-service issues will resolve, wherein determining the likelihood of quality-of-service issues includes mining the quality-of-service history database, wherein determining the likelihood of quality-of-service issues associated with the second electronic call is based upon, at least in part, determining a predicted second location of the second participant based upon, at least in part, a current location of a second participant and a trajectory of expected movement from the current location.

2. The computer program product of claim 1 wherein the plurality of instructions, when executed by the processor, cause the processor to perform operations further comprising:
providing to one or more of a user and a moderator a visual indicator of the likelihood of quality-of-service issues.

3. The computer program product of claim 2 wherein the visual indicator includes one or more of geographical and infrastructure-related information associated with the likelihood of quality-of-service issues.

4. The computer program product of claim 1 wherein the quality-of-service information further includes a second quality-of-service score associated with at least one of an electronic call, participant location data, connection information, and participant device information.

5. The computer program product of claim 1 wherein determining the likelihood of quality-of-service issues is based upon, at least in part, one or more of a location associated with the second participant, and a geographical or infrastructure-related feature.

6. The computer program product of claim 1 wherein determining the likelihood of quality-of-service issues is based upon, at least in part, one or more of a predicted call duration and calendar information.

7. The computer program product of claim 1 wherein determining the likelihood of quality-of-service issues is based upon, at least in part, one or more of connection information and participant device information.

8. A computer system comprising:
at least one processor;
at least one memory architecture coupled with the at least one processor;
a first software module executable by the at least one processor and the at least one memory architecture, wherein the first software module is configured to determine quality-of-service information associated with a first participant in a first electronic call;
a second software module executable by the at least one processor and the at least one memory architecture, wherein the second software module is configured to store the quality-of-service information in a quality-of-service history database, wherein the quality-of-service information includes one or more geographical regions designated with a quality-of-service score, based upon, at least in part, a quality-of-service threshold value set by a user; and
a third software module executable by the at least one processor and the at least one memory architecture, wherein the third software module is configured to determine a likelihood of quality-of-service issues associated with a second electronic call including determining a likelihood of when the quality-of-service issues will begin and a likelihood of when the quality-of-service issues will resolve, wherein determining the likelihood of quality-of-service issues includes mining the quality-of-service history database, wherein determining the likelihood of quality-of-service issues associated with the second electronic call is based upon, at least in part, determining a predicted second location of the second participant based upon, at least in part, a current location of a second participant and a trajectory of expected movement from the current location.

9. The computer system of claim 8 further comprising:
a fourth software module executable by the at least one processor and the at least one memory architecture, wherein the fourth software module is configured to provide to one or more of a user and a moderator a visual indicator of the likelihood of quality-of-service issues.

10. The computer system of claim 9 wherein the visual indicator includes one or more of geographical and infrastructure-related information associated with the likelihood of quality-of-service issues.

11. The computer system of claim 7 wherein the likelihood of quality-of-service issues is associated with the second participant associated with the second electronic call.

12. The computer program product of claim 7 wherein the quality-of-service information further includes a second quality-of-service score associated with at least one of an electronic call, participant location data, connection information, and participant device information.

13. The computer system of claim 7 wherein determining the likelihood of quality-of-service issues is based upon, at least in part, one or more of a location associated with the second participant, and a geographical or infrastructure-related feature.

14. The computer system of claim 7 wherein determining the likelihood of quality-of-service issues is based upon, at least in part, one or more of a predicted call duration and calendar information.

15. The computer system of claim 7 wherein determining the likelihood of quality-of-service issues is based upon, at least in part, one or more of connection information and participant device information.

* * * * *